United States Patent
Guo et al.

(10) Patent No.: US 12,221,510 B2
(45) Date of Patent: Feb. 11, 2025

(54) RECYCLABLE LAMINATE

(71) Applicant: Dow Global Technologies LLC, Midland, MI (US)

(72) Inventors: Yinzhong Guo, Pearland, TX (US); Tuoqi Li, Dallas, TX (US); Sudhanwa Dewasthale, Houston, TX (US); Jian Wang, Missouri City, TX (US); Thorsten Schmidt, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/754,521

(22) PCT Filed: Oct. 1, 2020

(86) PCT No.: PCT/US2020/053723
§ 371 (c)(1),
(2) Date: Apr. 5, 2022

(87) PCT Pub. No.: WO2021/086541
PCT Pub. Date: May 6, 2021

(65) Prior Publication Data
US 2024/0059825 A1    Feb. 22, 2024

Related U.S. Application Data

(60) Provisional application No. 62/926,727, filed on Oct. 28, 2019.

(51) Int. Cl.
C08G 18/62    (2006.01)
B32B 7/12    (2006.01)
(Continued)

(52) U.S. Cl.
CPC ........... *C08G 18/6208* (2013.01); *B32B 7/12* (2013.01); *B32B 27/08* (2013.01); *B32B 27/32* (2013.01);
(Continued)

(58) Field of Classification Search
CPC ............... C08G 18/6208; C08G 18/36; C08G 18/6547; C08G 18/792; C09J 175/04;
(Continued)

(56) References Cited

U.S. PATENT DOCUMENTS 5,486,570 A * 1/1996 St. Clair ............ C08G 18/2815
528/65
6,077,925 A  6/2000 Gerard
(Continued)

FOREIGN PATENT DOCUMENTS

BR   112017015984 A2   3/2018
CN   1396210 A   2/2003
(Continued)

OTHER PUBLICATIONS

English machine translation for CN102219887 (Year: 2011).*
(Continued)

*Primary Examiner* — Michael C Miggins
(74) *Attorney, Agent, or Firm* — Boyle Fredrickson, S.C.

(57) ABSTRACT

A polyolefin-based laminating adhesive composition for use in producing a mechanical recyclable material, the adhesive composition including a mixture of: (a) at least one saturated polyolefin polyol; and (b) at least one aliphatic multi-functional isocyanate compound; a process for producing the above adhesive composition; a mechanically recyclable multi-layer laminate including: (A) at least one first film substrate layer; (B) at least one second film substrate layer; and (C) at least one layer of the above polyolefin-based laminating adhesive composition; wherein the at least one
(Continued)

first film substrate layer is bonded to the at least one second film substrate layer via the adhesive composition layer; a process for producing the above mechanically recyclable multi-layer laminate; and a packaging article made from the above mechanically recyclable multi-layer laminate.

13 Claims, 3 Drawing Sheets

(51) Int. Cl.
    *B32B 27/08*     (2006.01)
    *B32B 27/32*     (2006.01)
    *B32B 37/12*     (2006.01)
    *B65D 65/40*     (2006.01)
    *C08G 18/36*     (2006.01)
    *C08G 18/65*     (2006.01)
    *C08G 18/79*     (2006.01)
    *C09J 5/00*     (2006.01)
    *C09J 175/04*     (2006.01)

(52) U.S. Cl.
    CPC .......... *B32B 37/1284* (2013.01); *B65D 65/40* (2013.01); *C08G 18/36* (2013.01); *C08G 18/6547* (2013.01); *C08G 18/792* (2013.01); *C09J 5/00* (2013.01); *C09J 175/04* (2013.01); *B32B 2250/02* (2013.01); *B32B 2250/242* (2013.01); *B32B 2255/10* (2013.01); *B32B 2255/26* (2013.01); *B32B 2307/306* (2013.01); *B32B 2307/31* (2013.01); *B32B 2307/518* (2013.01); *B32B 2307/54* (2013.01); *B32B 2307/748* (2013.01); *B32B 2553/00* (2013.01)

(58) Field of Classification Search
    CPC .......... B32B 7/12; B32B 27/08; B32B 27/32; B32B 37/1284; B32B 2250/02; B32B 2250/242; B32B 2255/10; B32B 2255/26; B32B 2307/306; B32B 2307/31; B32B 2307/518; B32B 2307/54; B32B 2307/748; B32B 2553/00; B65D 65/40
    See application file for complete search history.

(56) References Cited

U.S. PATENT DOCUMENTS

| | | | |
|---|---|---|---|
| 6,348,123 B1 | 2/2002 | Nakata et al. | |
| 6,737,013 B1 | 5/2004 | Kusudou et al. | |
| 7,976,951 B2 | 7/2011 | Griswold et al. | |
| 9,822,289 B2 | 11/2017 | Roock et al. | |
| 2010/0316871 A1 | 12/2010 | Fujiwara et al. | |
| 2017/0002134 A1 | 1/2017 | Smits et al. | |
| 2017/0207427 A1 | 7/2017 | Kouka et al. | |
| 2017/0321095 A1 | 11/2017 | Pela et al. | |
| 2017/0334183 A1 | 11/2017 | Kimura et al. | |
| 2018/0201815 A1 | 7/2018 | Kelch et al. | |
| 2018/0355092 A1 | 12/2018 | Smits et al. | |
| 2019/0010372 A1 | 1/2019 | Nakagawa et al. | |
| 2019/0270838 A1 | 9/2019 | Seehagen et al. | |
| 2019/0390094 A1 | 12/2019 | Wu et al. | |
| 2020/0362166 A1 | 11/2020 | Takakura et al. | |

FOREIGN PATENT DOCUMENTS

| | | | |
|---|---|---|---|
| CN | 1157455 C | 7/2004 | |
| CN | 1187403 C | 2/2005 | |
| CN | 101171317 A | 4/2008 | |
| CN | 101638464 A | 2/2010 | |
| CN | 101638467 A | 2/2010 | |
| CN | 103180403 A | 6/2013 | |
| CN | 103974962 A | 8/2014 | |
| CN | 106634778 B | 5/2017 | |
| CN | 109312044 A | 2/2019 | |
| CN | 111448236 A | 7/2020 | |
| EP | 1717272 B1 | 11/2012 | |
| EP | 2888305 B1 | 10/2018 | |
| EP | 3049454 B1 | 11/2018 | |
| JP | H02-274788 A | 11/1990 | |
| JP | H11-226956 A | 8/1999 | |
| JP | 2000-038471 A | 2/2000 | |
| JP | 2000-290631 A | 10/2000 | |
| JP | 2003-231486 A | 8/2003 | |
| JP | 2005350670 A | 12/2005 | |
| JP | 04736438 B2 | 7/2011 | |
| JP | 2018-051788 A | 4/2018 | |
| JP | 06466950 B2 | 2/2019 | |
| JP | 2019-099599 A | 6/2019 | |
| KR | 20180055986 A | 5/2018 | |
| MX | 2017013594 A | 8/2018 | |
| WO | 199902603 | 1/1999 | |
| WO | 2008/029887 A1 | 3/2008 | |

OTHER PUBLICATIONS

Tohmura S., et. al., "Preparation and Characterization of Wood Polyalcohol-Based Isocyanate Adhesives", Oct. 15, 2005, pp. 791-795, vol. 98 No. 2, Journal of Applied Polymer Science.
PCT/US2020/053723, International Search Report and Written Opinion with a mailing date of Jan. 12, 2021.

* cited by examiner

RECYCLABLE LAMINATE

FIELD

The present invention is related to a recyclable laminate; and more specifically, the present invention is related to a mechanically recyclable multi-layer laminated packaging material including a polyolefin-based laminating adhesive composition useful for producing the laminate which is capable of being recycled by mechanical means.

BACKGROUND

As the production capacity and global consumption of plastics continuously increase, the accumulative and irreparable damage to the ecosystem caused by plastic wastes becomes a growing concern that is widespread known to the public. Flexible packaging industry is one of the major territories dominantly occupied by plastic articles. Therefore, film manufacturers, packaging converters, and brand owners are all urgently seeking for a path to reduce, or more ideally to eliminate, plastic pollution. Among all the approaches to tackle this plastic challenge, the development of new, recyclable plastics emerges as a sustainable solution. Packaging converters are currently initiating plans to target recyclable/compostable packaging designs. Brand owners are also planning to achieve 100% recyclable or compostable packaging for its products starting in the next few years. Recyclable plastics will continue to be a volume growth market in the next coming years. Therefore, what is needed in the industry, particularly in the packaging industry, is the development of new technologies related to recyclable packaging materials.

Traditional flexible packaging design is based on laminating various functional layers composed of different materials such as polyethylene terephthalate (PET), bi-axially oriented polypropylene (BOPP), metalized PET or oriented polypropylene (OPP), aluminum foils, Nylon/polyimide, and the like, with a sealable layer such as low density polyethylene (LDPE), sealable OPP, and the like. Due to laminating together different materials, the generated flexible packaging material becomes non-recyclable because, hereto date, there is yet no economically practical and technically efficient process to separate the different film layers and to recycle each film material individually.

Conventional lamination adhesives used heretofore have included either acrylic-based or polyurethane-based adhesives. Using such conventional adhesives to laminate a combination of different polyolefin films (e.g., the combination of HDPE and LEPE; BOPE and LDPE; BOPP and LDPE; BOPP and BOPP, and the like), would make recycling the resultant packaging a challenge to the industry due in part to the fact that the laminating adhesives being used are dissimilar to polyolefin in the backbone chemistry of the adhesives. And, the adhesives are usually highly cross-linked, limiting the feasibility of making traditional packaging designs using such adhesives ready for recycle.

Multilayer co-extrusion is another widely adopted industrial process to fabricate lamination structures. However, regarding package recyclability, it is a challenge to prepare packaging materials containing pre-oriented films such as BOPE and BOPP, because the high temperature stage associated with extrusion tends to cause shrinkage of these pre-oriented films. Additionally, when functional films like metalized films or foil are employed in the co-extrusion fabrication process to form lamination structures, multilayer co-extrusion cannot, or barely, be used.

As aforementioned, there have been several prior art references which disclose adhesive compositions. For example, U.S. Pat. Nos. 6,077,925; 9,822,289B2; 7,976,951B2; and U.S. Pat. No. 6,348,123B1; and U.S. Patent Application Publication Nos. US20180201815A1; US20170321095A1; and US20180355092A1 disclose various adhesive compositions of specific components, processes for preparing such compositions, and some compositions are known to be used as laminating adhesives for various end uses. However, not one of the above prior art references heretofore has addressed the problem of how to provide recyclable packaging materials of polyolefin films laminated by polyolefin-based adhesives. All of the above patents disclose novel films and structures, but none of the prior art disclose or emphasize the recyclable structures.

Therefore, it is desired to provide a solution of making polyolefin-based packaging materials that are ready for mechanical recycle by laminating heat resistant polyolefin films such as HDPE, BOPE, BOPP, metalized BOPE, and metalized BOPP with a heat sealable film such as LDPE utilizing a polyolefin-based laminating adhesive.

SUMMARY

In one embodiment, the present invention is directed to a mechanically recyclable multi-layer laminate and particularly a laminate for manufacturing a laminated packaging material including a polyolefin-based laminating adhesive composition useful for producing the laminate wherein the laminate is capable of being recycled by mechanical means.

In another embodiment, the present invention is directed to a mechanically recyclable multi-layer laminated packaging material including the following layers:
  (a) at least one first film substrate layer;
  (b) at least one second film substrate layer; and
  (c) at least one layer of a polyolefin-based laminating adhesive composition; wherein the polyolefin-based laminating adhesive composition for use in producing a mechanically recyclable material includes a mixture of the following components:
    (i) at least one polyolefin polyol; and
    (ii) at least one aliphatic multi-functional isocyanate compound;
wherein the adhesive composition layer is disposed on the surface of at least one of the layers of the at least one first film substrate layer, component (a), and the at least one second film substrate layer, component (b), for binding layers (a) and (b) together; and wherein the at least one first film substrate layer is bonded to the at least one second film substrate layer via the adhesive composition layer.

In still another embodiment, the present invention includes a process for producing the above mechanically recyclable multi-layer laminated packaging material; wherein the mechanically recyclable multi-layer laminated packaging material is capable of being recycled by mechanical means.

In yet another embodiment, the present invention includes a mechanically recyclable multi-layer laminated packaging article made using the above mechanically recyclable multi-layer laminated packaging material; wherein the mechanically recyclable multi-layer laminated packaging article is capable of being recycled by mechanical means.

In even still another embodiment, the present invention includes a process for producing the above mechanically recyclable multi-layer laminated recyclable packaging article.

BRIEF DESCRIPTION OF THE DRAWINGS

In FIG. 1, absorbance (or abbreviated "abs") is plotted against wavelength ($cm^{-1}$).

FIG. 2 shows a comparison between a pure (virgin) sample without an adhesive and a sample of the present invention with an adhesive after remolding.

FIG. 3 shows a comparison between a pure (virgin) sample without an adhesive and a sample of the present invention with an adhesive after remolding.

DETAILED DESCRIPTION

Figure 1:
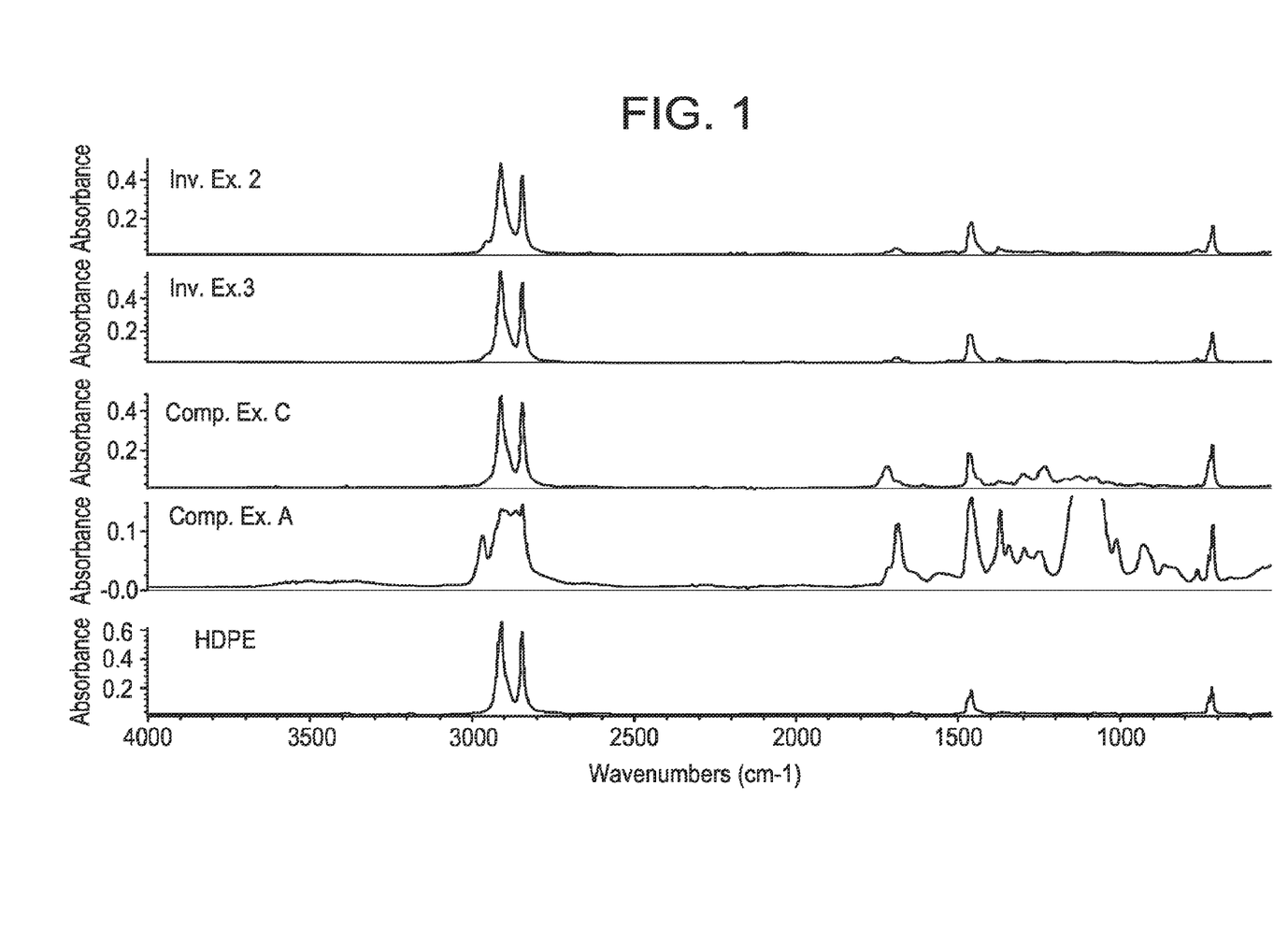
FIG. 1 is a graphical illustration of a representative Fourier-transform infrared spectroscopy (FTIR) spectra of peeled laminate samples (after 14 days of curing at 45° C.) and showing various cured adhesives in comparison to the spectra of HDPE film. FTIR is used to identify whether or not an adhesive material is similar to a polyolefin film; whether or not the adhesive material is compatible with the polyolefin film; and whether or not a laminate made from the adhesive material and the polyolefin film is recyclable by mechanical means.
Figure 2:
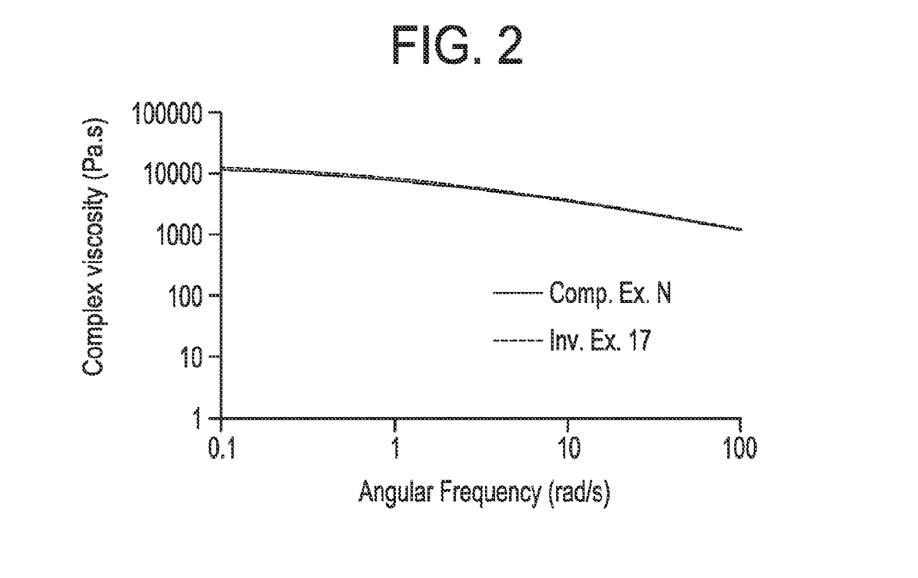
FIG. 2 is a graphical illustration of two curves, each curve plotting complex viscosity (Pa·s) versus angular frequency (rad/s).
Figure 3:
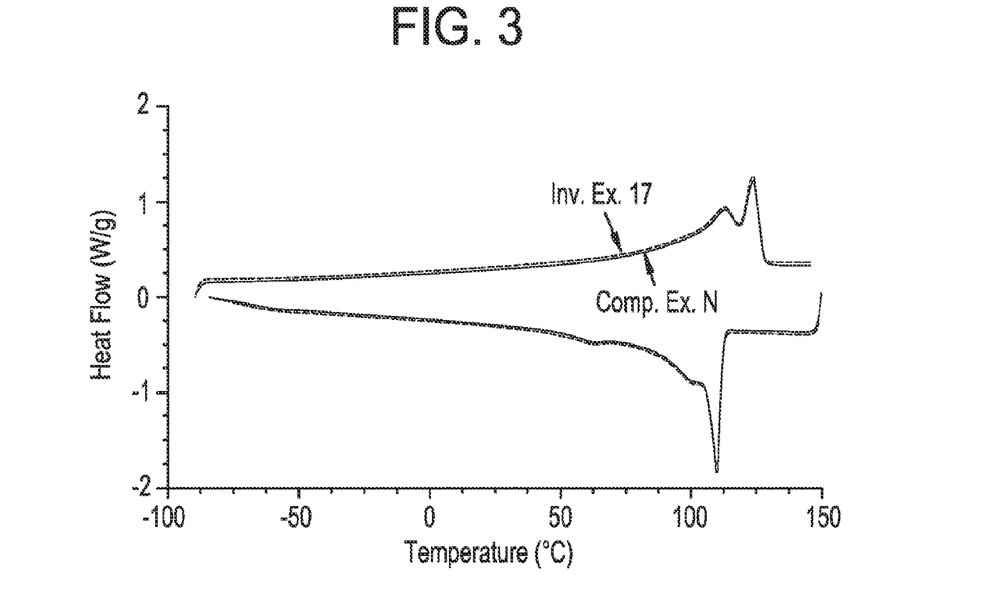
FIG. 3 is a graphical illustration of two curves, each curve plotting heat flow (W/g) versus temperature (° C.).
Figure 4:
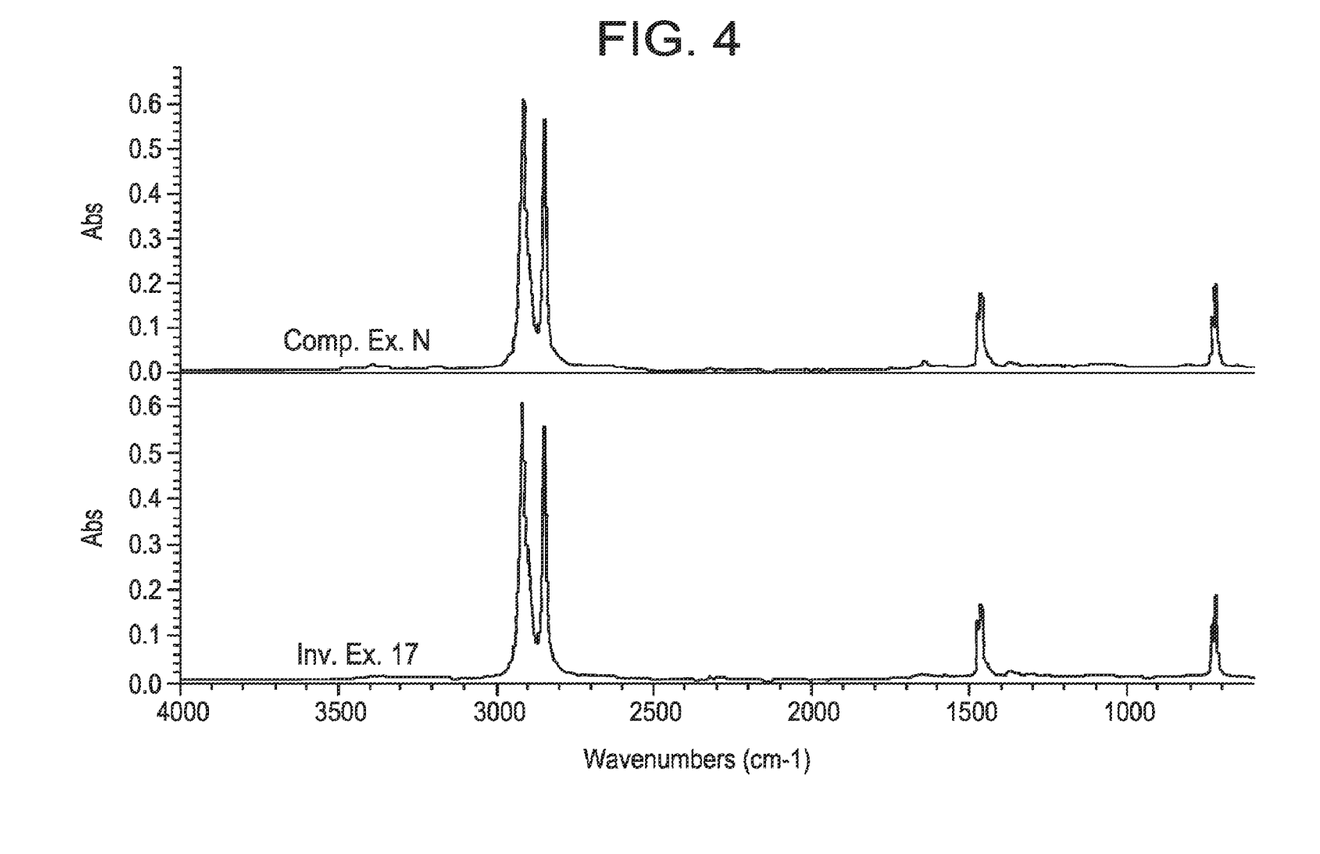
FIG. 4 is a graphical illustration of a representative FTIR spectra of peeled laminate samples showing a comparison between a pure (virgin) sample without an adhesive and a sample of the present invention with an adhesive after remolding.

"Polyolefin polyol" herein means a hydroxyl terminated polyolefin including straight chain molecules, branched molecules, and mixtures thereof. The polyolefin polyol can also be di-hydroxyl functional, multi-hydroxyl functional, or a mixture thereof.

"Mechanical recyclability", with reference to a used packaging material, herein means the capability of directly recycling a used package material made from a multilayer laminated film structure; wherein the recycling is carried out mechanically to re-film the recycled material without having to: (1) pre-separate the various film layers of the multi-layer laminated film; (2) pre-clean the residual adhesive present in the recycled material; and (3) add compatibilizers to the adhesive used to form the multilayer laminated film structure of the recycled material.

As used throughout this specification, the abbreviations given below have the following meanings, unless the context clearly indicates otherwise: "=" means "equal to"; @ means "at"; "<" means "less than"; ">" means "greater than"; "≤" means "less than or equal to"; "≥" means "greater than or equal to"; g=gram(s); mg=milligram(s); kg=kilograms; kg/$m^3$=kilograms per cubic meter; kwz power=kilowatts power; rpm=revolutions per minute; L=liter(s); mL=milliliter(s); g/L=grams per liter; Mw=Mass molecular weight; m=meter(s); m/min=meter(s) per min; μm=microns: μL=microliters; mm=millimeter(s); cm=centimeter(s); min=minute(s); s=second(s); hr=hour(s); mm/min=millimeter(s) per minute; rad/s=radian per second; lb/rm=pound per ream; ° C.=degree(s) Celsius; mPa·s=millipascals-seconds; kPa=kilopascals; Pa·s/$m^2$=pascals-seconds per meter squared; dtex or Decitex=grams per 10,000 meters; N=newton(s); cN=centinewton; $mm^2$=millimeter squared; mg KOH/g=hydroxyl value in terms of milligrams of potassium hydroxide per gram of polyol; cells/$mm^2$ is pore density value in terms of the number of cells per millimeter squared; %=percent, vol %=volume percent; and wt %=weight percent.

All percentages stated herein are weight percentages (wt %), unless otherwise indicated.

Temperatures are in degrees Celsius (° C.), and "ambient temperature" means between 20° C. and 25° C., unless specified otherwise.

In a broad embodiment, the multi-layer laminate structure of the present invention includes the combination of at least two film layer substrates adhered together by an adhesive composition or formulation layer.

For example, the multi-layer laminate product includes: (a) a first heat resistant film substrate of for example, HDPE, BOPP, or BOPE; (b) a second heat sealable film substrate of for example LDPE; and (c) a layer of the polyolefin-based laminating adhesive composition described herein below for binding the layers (a) and (b). One or more other optional film substrates can be used to produce the above multi-layer laminate structure, if desired.

The first layer, component (a), of the present invention can include one or more layers of, for example, HDPE, MDPE, BOPP, BOPE and mixtures thereof. In one preferred embodiment, the first layer can include, for example, HDPE, BOPP, and BOPE.

The thickness of the first film layer used to form the recyclable multi-layer laminate product of the present invention can be, for example, from 25 μm to 150 μm in one embodiment, from 30 μm to 100 μm in another embodiment and from 35 μm to 75 μm in still another embodiment.

The second film layer, component (b), of the present invention can include one or more layers of for example, LDPE, CPP, sealable OPP, and mixtures thereof.

The thickness of the second film layer used to form the recyclable multi-layer laminate product of the present invention can be, for example, from 20 μm to 100 μm in one embodiment, from 25 μm to 75 μm in another embodiment and from 30 μm to 60 μm in still another embodiment.

In a broad embodiment, the present invention includes a polyolefin-based lamination adhesive composition for use in producing mechanically recyclable laminated packaging materials. The layer of adhesive composition, component (c), used to bind the first and second film layers, components (a) and (b), respectively, includes at least one layer of a polyolefin-based laminating adhesive composition; wherein the polyolefin-based laminating adhesive composition for use in producing a mechanically recyclable material includes a mixture of: (i) at least one polyolefin polyol; and (ii) at least one aliphatic multi-functional isocyanate compound.

The adhesive composition includes, for example, a reactive mixture of: (i) at least one polyolefin polyol and (ii) at least one aliphatic multi-functional isocyanate compound. Other optional components (iii) can be added to the adhesive composition if needed. For example, optional components can include dimer fatty diols, catalysts, and other additives such as wetting agents, adhesion promoters, and the like.

The polyolefin polyols, component (i), used for making the polyolefin-based laminating adhesive composition useful in the present invention can include one or more polyolefin polyols. For example, the polyolefin polyol, component (i) of the above polyolefin-based laminating adhesive composition, can include polyolefin polyols having the following general chemical Structure (I):

Structure (I)

In Structure (I) above, m can be from 0 to 15; n can be from 1 to 40; p can be from 0 to 1; and q can be from 1 to 40. In addition, the polyolefin polyols of Structure (I) above, has a functionality of ≥2 in one general embodiment; and a molecular weight of from 500 to 7,000 in one general embodiment.

The polyolefin-based lamination adhesive of the present invention has several advantages compared to known lamination adhesives including, for example, the adhesive: (1) allows laminated packaging materials to be mechanically recyclable without conducting the step of films separation; (2) has a significantly low infrared (IR) absorbance (which is similar to the polyolefin material) compared to traditional polyurethane adhesives (e.g., polyester polyols, polyether polyols, and combinations thereof); (3) has good adhesion performance no matter dry bond strength or chemical resistance, which allows constructed recyclable packaging to be used for hot-fill medium performance applications; (4) can be applied by a solvent-free process or a solvent-based process with additional solvents; and (5) can avoid overprinting varnishes (OPV) to protect the inks on top of packaging by revise printing in BOPP/LDPE and BOPE/LDPE structures, which brings the clarity of printed information as direct print but needs OPV.

Polyolefin polyols having the above Structure (I) include, for example, hydroxyl-terminated saturated polybutadiene, hydroxyl-terminated polyethylene, hydroxyl-terminated polypropylene, hydroxyl-terminated saturated hydrocarbons and mixtures thereof. Two or more of the above polyolefin polyols can be used in a mixture, where the hydroxyl functional group is at least 2 and above.

In a preferred embodiment, the polyolefin polyols can include commercially available compounds having the above general chemical Structure (I) including, for example, saturated polybutadiene polyols with different molecular weights, such as KRASOL HLBH-P2000 and KRASOL HLBH-P 3000 (available from Total) and KRATON LIQUID L-2203 (available from Kraton); and mixtures thereof.

In addition, the polyolefin polyol of Structure (I) above, has a functionality of ≥2 in one general embodiment; a functionality of from ≥2 to 10 in another embodiment; and a functionality of from ≥2 to 5 in still another embodiment. Furthermore, the polyolefin polyol of Structure (I) above, has a molecular weight of from 500 to 7,000 in one general embodiment; from 1,000 to 5,000 in another embodiment; from 1,100 to 4,000 in still another embodiment; and from 1,500 to 3,000 in yet another embodiment.

The amount of polyolefin polyol used in making the polyolefin-based laminating adhesive composition of the present invention can be, for example, from 10 wt % to 95 wt % in one embodiment, from 40 wt % to 90 wt % in another embodiment and from 60 wt % to 80 wt % in still another embodiment, based on the total amount of compounds in the adhesive composition.

The aliphatic multi-functional isocyanate, component (b), used for making the polyolefin-based laminating adhesive composition of the present invention can include, for example, one or more aliphatic multi-functional isocyanate compounds. For example, the aliphatic multi-functional isocyanate can be, hexamethylene diisocyanate (HDI) dimer or trimer; 4,4'-methylenebis(cyclohexyl isocyanate (HMDI) dimer or trimer; isophorone diisocyanate (IPDI) dimer or trimer; or mixtures thereof. In other embodiments, aliphatic multifunctional isocyanates which have carbon atoms in the range of from 6 to 40 in one embodiment, from 6 to 22 in another embodiment, and from 6 to 18 in still another embodiment, can also be used in the present invention.

In one preferred embodiment, the aliphatic multi-functional isocyanate can include, for example, HDI trimer. In another preferred embodiment, the aliphatic multi-functional isocyanate can include commercially available compounds such as MOR-FREE™ C-33 (available from The Dow Chemical Company).

The amount of aliphatic multi-functional isocyanate used in making the polyolefin-based laminating adhesive composition of the present invention can be, for example, from 5 wt % to 40 wt % in one embodiment, from 8 wt % to 30 wt % in another embodiment and from 10 wt % to 25 wt % in still another embodiment, based on the total amount of compounds in the adhesive composition.

The respective amounts of polyisocyanate and the polyol are typically chosen such that there is a small excess of isocyanate (NCO) groups. Generally, the amount of components (a) and (b) are at a stoichiometry ratio (molar ratio) of isocyanate (NCO) groups to hydroxyl (OH) groups (NCO to OH) of from 1.7 to 1.0 of NCO to 1 OH in one embodiment, from 1.5 to 1.0 of NCO to 1 OH in another embodiment, from 1.4 to 1.0 of NCO to 1 OH in still another embodiment, and from 1.4 to 1.0 of NCO to 1 OH in yet another embodiment.

The polyols having the above general chemical Structure (I) can be optionally combined with other optional compounds. The other optional compounds include, for example, but are not limited to, saturated fatty dimer diols or triols such as PRIPOL™ 2030 or DEV™ 1242, or mixture thereof. The loading of the other optional compound in total formulation, in weight percent (wt %), can be for example from 0 wt % to 30 wt % in one embodiment, from 0 wt % to 20 wt % in another embodiment, and from 0 wt % to 10 wt % in still another embodiment.

The thickness of the adhesive layer used to bind the first and second layers together to form the recyclable multi-layer laminate product of the present invention can be, for example, from 0.5 μm to 5 μm in one embodiment, from 1 μm to 4 μm in another embodiment and from 1.5 μm to 3 μm in still another embodiment.

The multi-layer laminate structure of the present invention is produced by applying the adhesive composition described above onto at least a portion of the surface of a heat resistant film substrate to form an adhesive layer on the surface of the film substrate. The application of the adhesive composition can be carried out by conventional means known in the art of applying adhesive compositions or formulation. For example, the adhesive composition can be applied using conventional equipment and processes such as a solventless hot roll laminator for solventless composition, a solvent-based Gravure roll laminator, and a solvent-based FLEXO laminator for solvent-containing compositions.

In a general embodiment, the process for producing a multi-layer laminate product includes, for example, the steps of:

(I) providing: (a) a first film substrate, (b) a second film substrate; and (c) an adhesive composition;
(II) applying the adhesive composition to at least a portion of the surface of the first heat resistant film substrate and/or to at least a portion of the surface of the second film substrate to form an adhesive layer between the first and second film substrates;
(III) combining the first and second film substrates together with the adhesive layer under lamination, sufficient to form a multi-layer laminate structure; and
(IV) curing the structure of step (III) to form a multi-layer laminate structure. For example, the curing temperature can be from room temperature (about 25° C.) to 40° C. in one embodiment.

Step (I) is carried out by treating the polyolefin films with corona treater, as is normally done in a conventional lamination process, with a power in the range of from 1 kwz power to 3 kwz power in one embodiment, and from 1.5 kwz power to 2.5 kwz power in another embodiment.

Step (II) of the process includes applying the adhesive composition to at least a portion of the surface of the first heat resistant film substrate and/or to at least a portion of the surface of the second film substrate to form an adhesive layer between the first and second film substrates. The application of the adhesive composition can be carried out, for example, at a temperature of from 40° C. to 80° C. in one embodiment, from 50° C. to 70° C. in another embodiment, and from 60° C. to 65° C. in still another embodiment. If the temperature is below 40° C., the viscosity of the adhesive composition is too high to process. If the temperature is >80° C., the adhesive composition has a short (e.g., <1 hr) pot-life and shrinking of the polyolefin film can occur.

Step (III) of the above process is carried out by combining the first and second film substrates together with the adhesive layer under lamination, sufficient to form a multi-layer laminate structure after coating the adhesive on the first film and/or the second film and contacting the two films together. The two films are laminated together to form a laminated structure at 60° C. with a typical nip roll pressure of from 15 m/min to 310 m/min in one embodiment, from 20 m/min to 150 m/min in another embodiment, and 30 m/min to 100 m/min in still another embodiment.

In step (IV), the multi-layer film structure from step (III) can be cured at room temperature for 14 days in one embodiment, at a temperature of 40° C. for 7 days in another embodiment, or at a temperature of 40° C. in <4 days with a catalyst present in the adhesive layer. The curing temperature of the laminate structure can be from 20° C. to 50° C. in one embodiment, from 25° C. to 45° C. in another embodiment, and from 30° C. to 45° C. in still another embodiment.

Some of the advantageous properties exhibited by the resulting multi-layer laminate product produced according to the above described process, can include, for example, the laminate can be: (1) recycled; and (2) used in medium performance food packaging applications.

For example, the recyclability property of the multi-layer laminate structure can be from 50% to 100% in one embodiment; from 70% to 100% in another embodiment, and from 90% to 100% in still another embodiment. The "recyclability" property of the laminate structure of the present invention can be measured by the laminate's properties including, for example, the laminate's: (1) mechanical properties (e.g., tensile modulus), (2) thermal properties (e.g., differential scanning calorimetry [DCS]) and dynamic mechanical spectroscopy [DMS]), (3) rheology properties (e.g., complex viscosity), and (4) IR absorbance properties by comparing the same properties to that of a laminate structure of the prior art. Other properties, such as clarity and gel content, of the films present in the multi-layer laminate structure of the recycled materials can be measure by microscopy, if desired, to further determine the recyclability of the laminate film structure.

A broad embodiment of a process of producing a polyolefin-based laminating adhesive composition for use in making a mechanically recyclable laminated multi-layer packaging product, includes, for example, simply thoroughly mixing: (a) the polyolefin polyol described above; (b) the aliphatic multi-functional isocyanate described above; and (c) any optional ingredients to form an adhesive mixture which can be processed via conventional mixing equipment and techniques used for making mixtures.

The components (a)-(c) are mixed, for example, at a temperature of from 20° C. to 80° C. in one embodiment, from 30° C. to 75° C. in another embodiment, and from 50° C. to 70° C. in still another embodiment. Below a temperature of 20° C., the viscosity of the composition will be too high and a high viscosity will result in a low mixing efficient of components (a)-(c); and a temperature above 80° C. is too high of a temperature which will result in the adhesive composition have a short pot life (e.g., <1 hr).

If desired, in the process of making the polyolefin-based laminating adhesive composition, the process can include the one or more optional step(s). For example, one optional step may include mixing the composition with an over-head batch mixer to form a batch material or mixing the composition in a nozzle continuously during pumping of the composition.

Once the polyolefin-based laminating adhesive composition is made according to the process described above, the resultant adhesive composition can be used to prepare a mechanically recyclable laminated multi-layer packaging article or product. Some of the advantageous properties exhibited by the resulting laminating adhesive composition produced according to the above-described process, can include, for example, the adhesive: (1) has a low IR absorbance; (2) has good adhesion performance to polyolefin films and good chemical resistance; (3) can be applied by a solvent-free or a solvent-based process; and (4) is used to form laminated films with a good appearance.

For example, the mixing viscosity of the adhesive composition at 65° C. is <5,000 mPa·s in one embodiment, <3,500 mPa·s in another embodiment, and <2,500 mPa·s in still another embodiment. In yet another embodiment, the viscosity of the adhesive composition at 65° C. can be from 1,500 mPa·s to 2,500 mPa·s. If the viscosity of the composition is above 5,000 mPa·s, the coating process using such composition becomes difficult to perform in a solventless process.

For example, the adhesion performance property of the adhesive composition can be measured by measuring the T-peel bond strength of the composition. For example, the T-peel bond strength is measured on a 25 mm strip of laminate sample at a rate of 250 mm/min on an Instron tensile tester with a 200 N loading cell. Three strips are tested for each laminate sample and high and mean bond strengths are recorded together with the failure mode. In the case of film tear and film stretch, the high value is reported.

In other failure modes, the average T-peel bond strength is reported. Typical failure modes include: "AF" for adhesive failure (adhesive with primary), "AT" for adhesive transfer (adhesive with secondary), "AS" for adhesive split (cohesive failure of adhesive), "FT" for film tear (destruct bond), "FS" for film stretch (destruct bond), and "MT" for metal transfer.

The polyolefin polyol and aliphatic isocyanate curing system is used for producing a recyclable multi-layer laminate product as described above. The polyolefin polyol and aliphatic isocyanate curing system can also be used for surface over printing, varnish for the recyclable packaging for additional packaging performance, such gloss, abrasion resistance, thermal resistance, ink protection, application for near IR detection, and the like.

EXAMPLES

The following examples are presented to further illustrate the present invention in detail but are not to be construed as limiting the scope of the claims. Unless otherwise indicated, all parts and percentages are by weight.

Various ingredients, components, additives, or raw materials used in the Inventive Examples (Inv. Ex.) and the Comparative Examples (Comp. Ex.) which follow are described in Table I:

TABLE I

Raw Materials

| Material | Brief Description | Supplier |
|---|---|---|
| MOR-FREE ™ C-33 | aliphatic isocyanate compound | The Dow Chemical Company (Dow) |
| VORANOL ™ 4240 | polyether polyol based on propylene oxide with ethyleneoxide capping | Dow |
| ADCOTE ™ 545E | polyester polyol dissolved in ethyl acetate | Dow |
| MOR-FREE ™ 403A | aromatic isocyanate prepolymer | Dow |
| MOR-FREE ™ C-117 | polyester polyol | Dow |
| PRIPLAST ™ 3190 | amorphous polyester polyol | Croda |
| KRASOL ™ F-3000 | polybutadiene polyol | Total |
| KRASOL ™ HLBP P-3000 | hydrogenated polybutadiene polyol | Total |
| KRASOL ™ HLBP P-2000 | hydrogenated polybutadiene polyol | Total |
| DEV 1242 | hydrogenated dimer fatty polyol (experimental material) | Croda |
| GF-19 film | high slip low density polyethylene film, thickness 1.5 mil | Berry Plastics Corp. |
| HDPE film | high density polyethylene film; thickness 2 mil; blown film resin grade ELITE ™ 56401 | Dow |
| ELITE ™ 56401 | high density polyethylene | Dow |
| BOPE film | bi-axially orientated polyethylene film, thickness = 25 μm | Dow |
| BOPP film | bi-axially orientated polypropylene film, thickness = 0.75 mil | Film Tech Inc. |

Adhesive Formulations

The polyolefin-based adhesive formulations (Inventive Examples 1-5) and traditional polyether/polyester-based adhesive formulations (Comparative Examples A-D) were prepared according to the recipes detailed in Table II and III. The properties of the above formulations are also listed in Tables II and III.

TABLE II

Polyolefin-Based Adhesive Formulation Recipes and Properties

| Ingredient | Comp. Ex. A (g) | Inv. Ex. 1 (g) | Inv. Ex. 2 (g) | Inv. Ex. 3 (g) | Inv. Ex. 4 (g) |
|---|---|---|---|---|---|
| KRASOL ™ F-3000 | 12.68 | — | — | | |
| DEV-1242 | | | | 2.2 | 0.6 |
| KRASOL ™ HLBP P-3000 | — | 13.08 | — | | |
| KRASOL ™ HLBP P-2000 | — | — | 12.28 | 8.8 | 11.3 |
| MOR-FREE ™ C-33 | 2.32 | 1.92 | 2.72 | 4.06 | 3.16 |
| Toluene | 35 | 35 | 35 | 35 | 35 |
| NCO index | | 1.30 | | | |
| Solids Content (%) | 30 | 30 | 30 | 30 | 30 |

TABLE III

Polyether/Polyester-Based Adhesive Formulation Recipes and Properties

| Ingredient Charge (g) | Comp. Ex. B | Comp. Ex. C | Comp. Ex. D | Comp. Ex. E |
|---|---|---|---|---|
| VORANOL ™ 4240 | 13.34 | — | — | — |
| PRIPLAST ™ 3190 | — | 12.05 | — | — |
| ADCOTE ™ 545E | — | — | 23.76 | — |
| MOR-FREE ™ 403A | — | — | — | 7.50 |
| MOR-FREE ™ C-117 | — | — | — | 7.50 |
| MOR-FREE ™ C-33 | 1.68 | 3.01 | 0.79 | — |
| Ethyl Acetate | 35 | 35 | 25.6 | 35 |
| NCO index | | | 1.30 | |
| Solids Content (%) | 30 | 30 | 30 | 30 |

General Procedure for Preparing Laminates

Laminates were prepared using oil heated roll hand laminator with the nip temperature set at 150° F. at a running speed was set about 20 ft/min (0.1 m/s). Coating weight was adjusted to be from 2.0 lbs/ream to 2.2 lbs/ream (3.3 g/m$^2$-3.6 g/m$^2$). The laminates were prepared sheet by sheet about 12×10 in$^2$ (0.075 m$^2$) coated area. The adhesives were coated using a Meyer rod #3 on the primary film and then completely dried in a 90° C. oven for 3 min to 5 min. The coated primer films were laminated onto the second films by the oil heated hand laminator at about 40 PSI (276 kPa) pressure. The formed laminates were allowed to cure at 45° C. for 2 weeks. The bond strength was tested after 1 day, 7 days and 14 days. Polyolefin films were particularly evaluated, including HDPE/GF-19; BOPE/GF-19; and BOPP/BOPP structures.

In Inv. Ex. 3, a lamination process was also conducted using a Nordmeccanica LaboCombi pilot laminator. The formulation without solvent was first applied to a primary film (BOPE in this particular case), followed by laminating the primary film with a secondary film (GF-19). The coating weight was maintained at 1.17 lb/ream (1.90 g/m$^2$), within the application range of typical solventless laminating adhesives. The formed laminate sample was allowed to cure at 45° C. for 2 weeks. The bond strength was tested after 1 day, 7 days and 14 days.

Performance Evaluation

T-Peel Bond Strength

The T-peel bond strength was measured on a 1-inch (25 mm) strip at a rate of 10 inches/min (250 mm/min) on an Instron tensile tester with a 200 N loading cell. Three strips were tested for each laminate and high and mean strength were recorded together with the failure mode. In case of film tear and film stretch, the high value was reported and in other failure modes the average T-peel bond strength was reported. Typical failure modes include:

AF=Adhesive failure (adhesive with primary);
AT=Adhesive transfer (adhesive with secondary);
AS=Adhesive split (cohesive failure of adhesive);
FT=Film Tear (substrate stretch or failure);
DL=Delamination; and
TL=Tunneling.

Boil-in-Bag Test of Laminates

Laminates were subjected to a boil-in-bag test and the test was conducted as follows: A cured laminate (9 inches×11 inches) (0.062 m$^2$) was folded over to form a double layer such that the PE film of one layer was in contact with the PE film of the other layer. The edges were then trimmed with a paper cutter to obtain a folded piece about 5 inches×7 inches (0.022 m$^2$). The edges were then heat sealed to form a pouch with an interior size of 4 inches×6 inches (0.015 m$^2$). The pouches were then filled 100 mL of 1/1/1 sauce (blend of equal parts by weight of catsup, vinegar and vegetable oil) through the open edge. After filling, the pouch was sealed in a manner that minimized the air entrapment inside of the pouch. The filled pouches were then carefully placed in boiling water and kept immersed in the water for 30 min or 60 min. When completed, the extent of tunneling, delamination or leakage was compared with marked pre-existing flaws. The bags were then emptied and at least three 1-inch (25 mm) wide strips were cut from the pouches and T-peel bond strength was measured as soon as possible.

Chemical Aging Test of Laminates

The laminates were subjected to a chemical aging test and the test was conducted as follows: Laminates were made from the HDPE/GF-19, or BOPE/GF-19 as described above. One of the 9 inches×12 inches (23 cm×30.5 cm) sheets of laminate was folded over to give a double layer about 9 inches×6 inches (23 cm×15.3 cm) such that the polymer film of one layer was in contact with the polymer film of the other layer. The edges were trimmed on a paper cutter to give a folded piece about 5 inches×7 inches (12.7 cm×17.8 cm). Two long sides and one short side was heat sealed at the edges to give a finished pouch with an interior size of 4 inches×6 inches (10.2 cm×15.2 cm). The heat sealing was done at 350° F. (177° C.) for 1 second at a hydraulic pressure of 40 PSI (276 kPa). Two or three pouches were made for each test. Pouches were filled through the open edge with 25 mL of 1:1:1 sauce (blend of equal parts by weight of ketchup, vinegar and vegetable oil). Splashing the filling onto the heat seal area was avoided as this could cause the heat seal to fail during the test. After filling, the top of the pouch was sealed in a manner that minimized air entrapment inside of the pouch.

The seal integrity was inspected on all four sides of pouches to ensure that there were no flaws in the sealing that would cause the pouch to leak during the test. Any defected pouches were discarded and replaced. In some cases, flaws in the laminate were marked to identify whether new additional flaws were generated during the testing. The pouches containing the different sauces at a 1:1:1 ratio were then placed in a convection oven set at 50° C. for 100 hr. The pouches were removed after aging and the extent of tunneling, blistering, de-lamination, or leakage was compared with any of the marked preexisting flaws. The observations were recorded. The pouches were cut open, emptied, and rinsed with soap and water. One or more one-inch (2.54 cm) strips were cut from the pouches and the laminate bond strength was measured according to the standard bond strength test described earlier. This was done as soon as possible after removing the pouch contents. The interior of the pouches was examined and any other visual defects were recorded.

Bond Strength and Product Resistance

The bond performance and product resistance properties of prepared laminates are summarized in Tables IV, V and VI. In the following Tables IV, V and VI, "NC" stands for "not cured"; and "NM" stands for "not measured" or "not measurable".

TABLE IV

Adhesion Performance of Laminate Structure: HDPE/Adhesive/LDPE (N/2.54 cm)

| Example No. | Adhesive from Example No. | 1 day | 7 days | 14 days | Chemical Aging | Boil-in-bag |
|---|---|---|---|---|---|---|
| Comp. Ex. F | Comp. Ex. A | 2.27; AS | 3.30; AS | 3.34; AS | 1.97; AS | NM |
| Inv. Ex. 5 | Inv. Ex. 1 | 12.22; AS | 12.39; AS/AT | 12.13; AS/AT | 10.21; AS/FS | NM |
| Inv. Ex. 6 | Inv. Ex. 2 | 4.33; AS | 12.93; AS/AT | 12.41; AT/AS | 8.29; AS | 9.36; AS/FS |
| Inv. Ex. 7 | Inv. Ex. 3 | 11.00; AS | 10.45; AS | 10.70; AS | 8.39; AS | 7.45; AS |
| Inv. Ex. 8 | Inv. Ex. 4 | 10.54; AS | 11.20; AS | 10.58; AS | 10.22; AS | 7.86; AS |

TABLE IV-continued

Adhesion Performance of Laminate Structure: HDPE/Adhesive/LDPE (N/2.54 cm)

| Example No. | Adhesive from Example No. | 1 day | 7 days | 14 days | Chemical Aging | Boil-in-bag |
|---|---|---|---|---|---|---|
| Comp. Ex. G | Comp. Ex. B | 0.01; AS; NC | 0.85; AS/AT | 1.16; AS/AT | 1.75; AF | 0.70; AF |
| Comp. Ex. H | Comp. Ex. D | 18.16; FT | 21.11; FT | 19.06; FT | 10.38; AS | NM |
| Comp. Ex. I | Comp. Ex. E | 24.14; FT | 27.44; FT | 28.50; FT | 11.23; FS | NM |

TABLE V

Adhesion Performance of Laminate Structure: BOPE/Adhesive/LDPE (N/2.54 cm)

| Example No. | Adhesive from Example No. | 1 day | 7 days | 14 days | Chemical Aging | Boil-in-Bag |
|---|---|---|---|---|---|---|
| Comp. Ex. J | Inv. Ex. A | 1.14; AS | 4.94; FT | 5.54; FT | 0.88; AS | NM |
| Inv. Ex. 9 | Inv. Ex. 1 | 7.80; FT | 8.02; FT | 6.66; FT | 2.38; AS | 3.81; AF/TL |
| 10 | Inv. Ex. 2 | 4.99; FT | 6.43; FT | 6.85; FT | 2.26; AS | 3.56; AF/TL |
| 12 | Inv. Ex. 3 | 5.67; FT | 6.26; FT | 5.08; FT | 2.34; AS | 2.07; AS |
| 11 | Inv. Ex. 3* | 4.62; FT | 6.04; FT | 4.70; FT | 2.72; AS | 4.40; AF/TL |
| 13 | Inv. Ex. 4 | 6.70; FT | 6.13; FT | 5.63; FT | 2.62; AS | 4.72; AF/TL |
| Comp. Ex. K | Comp. Ex. A | 0.05; AS; NC | 0.64; AS | 0.40; AS | 0.41; AF/DL | 0.24; AF/DL |
| Comp. Ex. L | Comp. Ex. C | 11.08; FT | 11.63; FT | 9.66; FT | 2.53; AS | 4.02; AF/TL |

Notes for Table V:
*This example was prepared via a LaboCombi, a pilot laminator, using a solventless process.

TABLE VI

Adhesion Performance of Laminate Structure: BOPP/Adhesive/BOPP (N/2.54 cm)

| Example No. | Adhesive from Example No. | 1 day | 7 days | 14 days |
|---|---|---|---|---|
| Inv. Ex. 14 | Inv. Ex. 2 | 4.43; FT | 2.16; AS | 2.63; AS |
| Inv. Ex. 15 | Inv. Ex. 3 | 3.58; FT | 1.89; AS | 1.97; AS |
| Inv. Ex. 16 | Inv. Ex. 4 | 3.56; FT | 2.20; AS | 2.30; AS |
| Comp. Ex. M | Comp. Ex. A | 0.01; AS; NC | 0.81; AS | 0.55; AS |

Recyclability of the Laminated Structure Comparing the BOPE/LDPE Film

The recyclability was evaluated by remolding the laminated structure of BOPE/Inv. Ex. 3 adhesive/LDPE (Inv. Ex. 3) and comparing the remolded material of Inv. Ex. 3 with a two-layer structure of BOPE/LDPE. The evaluation was conducted by Haake remolding followed by compressing the material to 1 mm thickness sheet.

Prior to the procedures of Haake bowl mixing and compressed sheet molding of the laminated film and the control bare film; the following general process equipment and process conditions were used:

Equipment

An RS5000 equipped with a Haake Rheomix 3000 mixer with 25% GF Teflon bushings and cam style rotors were used. The mixer was attached to a RS5000 torque rheometer drive unit and controlled by "System 5", a PC-based control/data acquisition software designed to operate the RS5000 drive.

A Carver Hydraulic Compressor with a 114 mm×114 mm×0.89 mm chase, four Teflon sheets, and two mirror plates was used.

Run Conditions

Polymer samples were melt-blended in the heated mixer at a temperature of 160° C. and at a mixing speed of 5 rpm to a maximum of 20 rpm, but the mixing speed was varied to keep mixture below 180° C. for 5 min. A nitrogen purge block was included on top to limit sulfur oxidation. The total mixing time of the mixture was from 20 min to 25 min.

To the heated mixer, 125 g of film samples was added as the mixer speed ran at 5 rpm at 160° C. The temperature was controlled using the bowl's Zone 2 sample melt thermocouple by splitting the melt and block thermocouple configuration; and Zones 1 and 3 were controlled by the block thermocouples. A sample was removed from the heated mixer and quickly cooled on chilled platens of the Carver hydraulic press at 13,7895 kPa for about 3 min.

Compressed sheet samples were prepared from 15 g to 16 g of the Haake remolded sample in a Carver press at the following conditions: (1) the temperature of the press was 188° C. in a 114 mm×114 mm×0.89 mm chase; (2) the sample for the first 3 min was in heated platens (platen numbers 1 and 2) of the Carver press; (3) after 3 min, the sample was moved to the lower platens (platen numbers 3 and 4) of the Carver press; and (4) then, the sample was cooled to 20° C. for 3 min. In the above process, bubbles forming on the sheet is not desirable. The resultant sheet is desired to be thinner than 3.18 mm.

The results indicate no significantly change of mechanical property after the BOPE and LDPE are laminated together with the adhesive of Inv. Ex. 3, which preliminarily identifies the recyclability of the new laminating structure.

Table VII describes the results of the measured mechanical properties of laminated structures of BOPE and LDPE with the adhesive of Inventive Example 3 and comparing the properties to a blend of BOPE and LDPE.

TABLE VII

| | | Mechanical Properties of Laminated Structures | | | |
|---|---|---|---|---|---|
| Example No. | Laminate Structure | Breaking Stress σ(b) (MPa) | Elongation Strain ε(b) (%) | Yield Strain Σy (MPa) | Elastic Modulus (MPa) |
| Comp. Ex. N | BOPE/LDPE -- compressed sheet | 25.7 | 772 | 11.1 | 274.8 |
| Inv. Ex. 17 | BOPE/Adhesive of Inv. Ex. 3/ LDPE - compressed sheet | 22.9 | 695 | 10.9 | 269.9 |

We claim:

1. A polyolefin-based laminating adhesive composition for use in producing a mechanical recyclable material, the adhesive composition comprising a mixture of:
   (a) from 40 weight percent to 90 weight percent of (i) at least one saturated polyolefin polyol, and (ii) an optional saturated fatty dimer polyol;
   (b) from 10 weight percent to 30 weight percent of at least one aliphatic multi-functional isocyanate compound; and
   (a)(i), (a)(ii), and (b) amount to 100 weight percent of the composition.

2. The composition of claim 1, comprising a blend of (a)(i) the at least one saturated polyolefin polyol, and (a)(ii) the saturated fatty dimer polyol.

3. The composition of claim 1, wherein the concentration of the at least one saturated polyolefin polyol, component (a), is from 70 weight percent to 85 weight percent; and wherein the concentration of the at least one aliphatic multi-functional isocyanate compound, component (b), is from 10 weight percent to 30 weight percent.

4. The composition of claim 1, wherein the at least has one saturated polyolefin is a saturated polyol hydroxyl-terminated polyolefin.

5. The composition of claim 1, wherein the at least one aliphatic multi-functional isocyanate compound is a hexamethylene diisocyanate dimer, a hexamethylene diisocyanate trimer, and mixtures thereof.

6. The composition of claim 1, wherein the least one saturated polyolefin polyol (a) has the Structure (I)

Structure (I)

wherein
m is from 0 to 15,
n is from 1 to 40,
p is from 0 to 1,
q is from 1 to 40.

7. A mechanically recyclable multi-layer laminate comprising:
   (A) at least one first film substrate layer;
   (B) at least one second film substrate layer; and
   (C) at least one layer of a polyolefin-based laminating adhesive composition;

wherein the polyolefin-based laminating adhesive composition for use in producing a mechanically recyclable material includes a mixture of:
   (a) from 40 weight percent to 90 weight percent of (i) at least one saturated polyolefin polyol, and (ii) an optional saturated fatty dimer polyol;
   (b) from 10 weight percent to 30 weight percent of at least one aliphatic multi-functional isocyanate compound,; and
   (a)(i), (a)(ii), and (b) amount to 100 weight percent of the composition;

wherein the adhesive composition layer is disposed on the surface of at least one of the layers of the at least one first film substrate layer, component (A), and the at least one second film substrate layer, component (B), for binding layers (A) and (B) together; and wherein the at least one first film substrate layer is bonded to the at least one second film substrate layer via the adhesive composition layer.

8. The laminate of claim 7 comprising a mechanically recyclable packaging laminate material.

9. A mechanically recyclable packaging article made from the laminate of claim 7.

10. A polyolefin-based laminating adhesive composition for use in producing a mechanical recyclable material, the adhesive composition comprising a mixture of:
    (a) at least one saturated polyolefin polyol having the Structure (I)

Structure (I)

wherein
m is from 0 to 15,
n is from 1 to 40,
p is from 0 to 1,
q is from 1 to 40; and
   (b) at least one aliphatic multi-functional isocyanate compound.

11. The composition of claim 10, comprising
    (a) from 40 weight percent to 90 weight percent of the at least one saturated polyolefin polyol; and
    (b) from 30 weight percent to 10 weight percent of at least one aliphatic multi-functional isocyanate compound; and (a) and (b) amount to 100 weight percent of the composition.

12. The composition of claim 10 further comprising from 40 weight percent to 90 weight percent of a blend of (a)(i) the at least one saturated polyolefin polyol, and (a)(ii) a saturated fatty dimer polyol.

13. The composition of claim 12 wherein, (a)(i), (a)(ii), and (b) amount to 100 weight percent of the composition.

* * * * *